Figure 1:
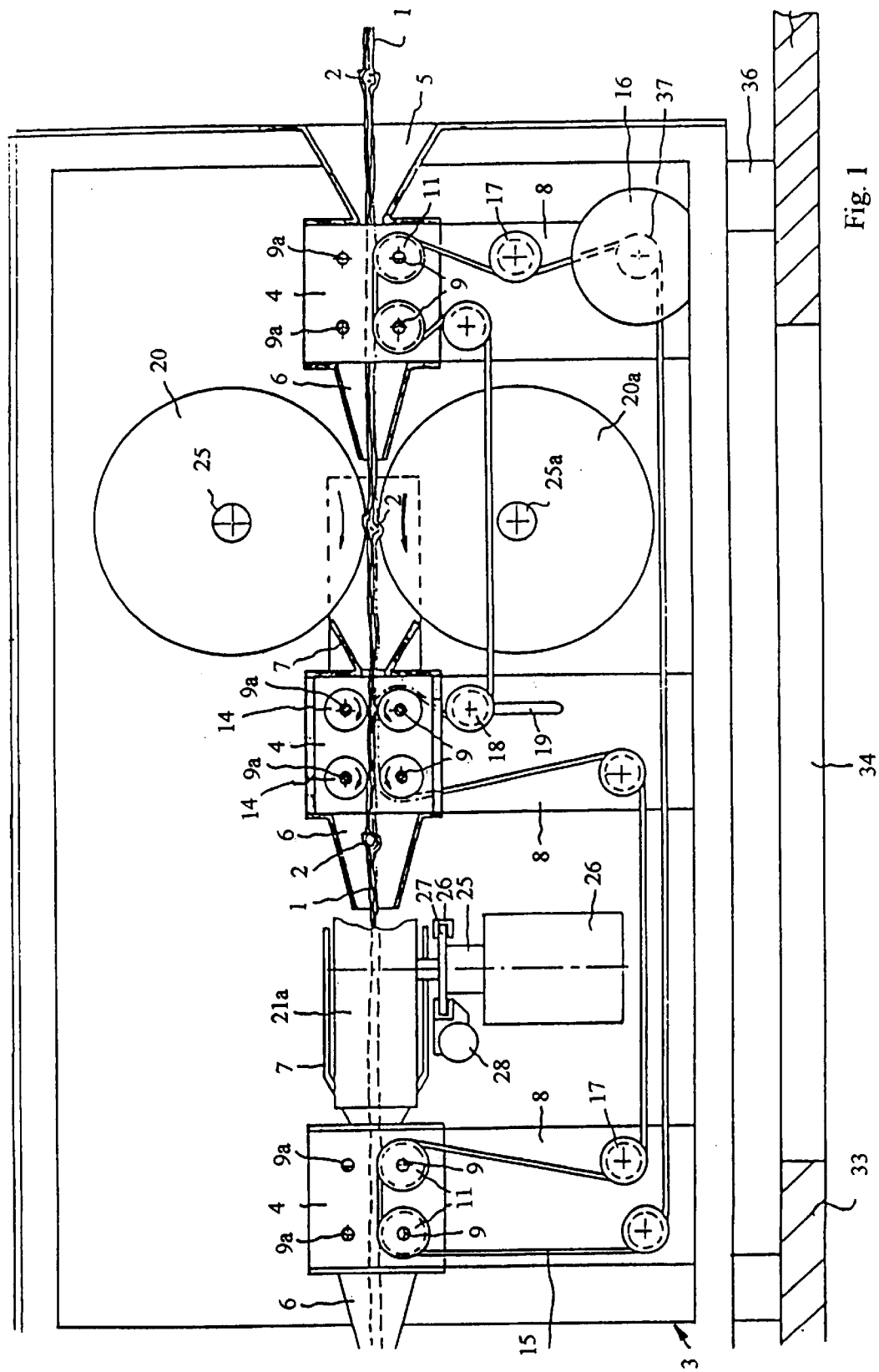

United States Patent [19]
Auer et al.

[11] Patent Number: 6,016,626
[45] Date of Patent: Jan. 25, 2000

[54] MACHINE AND PROCESS FOR WORKING THE SURFACE OF LONG, NARROW OBJECTS

[76] Inventors: Peter Auer, Friedhof Strasse 12, D-78262 Gailingen, Germany; Martin Auer, Auffahrt strasse 1036, CH-8215 Hallau, Switzerland

[21] Appl. No.: 08/992,776

[22] Filed: Dec. 17, 1997

[30] Foreign Application Priority Data

Dec. 17, 1996 [DE] Germany ............................ 196 52 510

[51] Int. Cl.⁷ .............................. A01C 29/00; A01G 1/00
[52] U.S. Cl. ........................................ 47/1.01; 47/6; 47/7
[58] Field of Search ................ 47/1.01 R, 6, 7; 142/32; 144/208.8

[56] References Cited

U.S. PATENT DOCUMENTS

| | | | |
|---|---|---|---|
| 887,519 | 5/1908 | Reed | 47/1.01 |
| 2,588,903 | 3/1952 | Akins | 144/208.8 |
| 2,592,833 | 4/1952 | Swanson | 47/1.01 |
| 2,611,215 | 9/1952 | Johnson | 47/1.01 |
| 2,800,934 | 7/1957 | Hosmer | 144/208.8 |
| 2,848,841 | 8/1958 | Kuts | 144/208.8 |
| 2,865,135 | 12/1958 | Gamboni et al. | 47/1.01 |
| 2,907,151 | 1/1959 | Peterson | 51/281 |
| 3,019,825 | 2/1962 | Herolf | 144/208.8 |
| 3,189,067 | 6/1965 | Dillingham | 144/208.8 |
| 3,574,970 | 4/1971 | Geytenbeek | 47/7 |
| 3,680,255 | 8/1972 | Grigorov | 47/6 |
| 3,913,644 | 10/1975 | Braun | 144/208.8 |
| 3,969,843 | 7/1976 | Wahler et al. | 47/6 |
| 3,991,800 | 11/1976 | Palmquist | 144/208.8 |
| 4,154,020 | 5/1979 | Paz et al. | 47/6 |
| 4,601,129 | 7/1986 | Peev et al. | 47/6 |
| 4,839,986 | 6/1989 | Grantham | 47/6 |
| 4,937,971 | 7/1990 | Collas et al. | 47/6 |
| 4,944,115 | 7/1990 | Patrucco | 47/7 |
| 5,293,714 | 3/1994 | Bouchard et al. | 47/1.01 |
| 5,651,212 | 7/1997 | Jensen | 47/1.01 |
| 5,704,409 | 1/1998 | Brisson | 144/208.8 |

FOREIGN PATENT DOCUMENTS

| | | | |
|---|---|---|---|
| 383410 | 8/1990 | European Pat. Off. | 47/1 B |
| 2379245 | 10/1978 | France | 47/1 B |
| 2408296 | 7/1979 | France | 47/1 B |
| 2 536 693 | 11/1982 | France | A01G 17/00 |
| 2580460 | 10/1986 | France | 47/1 B |
| 2 648 670 | 6/1989 | France | A01G 17/00 |
| 0 374 063 | 6/1990 | France | A01G 1/06 |
| 2 684 842 | 12/1991 | France | A01G 17/02 |
| 3546445 | 9/1986 | Germany | 47/1 B |
| 2214496 | 9/1989 | United Kingdom | 47/1 B |

OTHER PUBLICATIONS

Advertisement for UBMAVER Machine, Date Unknown.
The Art Of Grafting And Budding, Charles Baltet, pp. 158 and 159, Aug. 1882.

*Primary Examiner*—Michael J. Carone
*Assistant Examiner*—Fredrick T. French, III

[57] ABSTRACT

A machine for the surface treatment of long, narrow objects, more particularly vine shoots, with the following features:

a frame fixture (3), that defines the direction of motion (32);

at least one conveyor module (4), that has at least one pair of conveyor rollers (14), with a conveyance channel between them, and that is arranged with these along the axis of motion (32);

at least two brushes (20, 20a) that define a processing channel that runs along the axis of motion (32).

25 Claims, 3 Drawing Sheets

MACHINE AND PROCESS FOR WORKING THE SURFACE OF LONG, NARROW OBJECTS

The invention concerns a machine for working the surfaces of long, narrow objects, in particular vine shoots, and a process for removing buds from grafting stock.

In the process of grafting vines, shoots of so-called stock are grafted with a scion. The new plant formed in this manner develops roots at its free end, and the grafted grape variety sends out new shoots. The stock itself, however, is supposed to have no buds: any buds appearing on the stock, which are known as "eyes", must be removed, and are referred to as trimmings.

The buds are usually removed from the stock by hand; the known mechanical processes, for example singeing, are ill-adapted to this task, since their workings cannot be sufficiently targeted, and they run the risk of damaging the bark of the stock in the process of destroying the buds. A system of rotating, cutting blades can also be used, but once again there is a risk of damaging the stock, particularly if it has grown in an irregular or crooked habit. Individual buds on the stock are frequently missed by this process, and they must then be removed by hand.

The new machine allows not only vines but other long, narrow objects to be processed. Such objects may be of either natural or man-made origin.

The purpose of the invention is to develop a machine and a process for working the surface of long, narrow objects, so that unwanted buds can be removed from vine shoots in a manner that is both efficient and easy to supervise, and one that can also be used for cleaning or working the surfaces of other long, narrow objects.

The purpose as stated is accomplished by means of the features listed in claims 1 and 25, and is further formulated and developed by means of the additional features of the subsidiary claims.

Using the invention, the long, narrow objects are fed by conveyor modules through one or more pairs of rotating brushes, whereby the brushes are arranged so that the buds are rubbed off or "erased" from the vine shoot without any damage to its bark or its wooden substance. The brushes, their speed of rotation and the speed of advance of the long, narrow objects are specifically adjusted to the material to be processed. This is also true for the spacing between the brushes. The procedure can be left to run automatically to a large extent, i.e. without placing any special demands on service personnel. Besides removing the buds, the device can also clean away any earth, mud etc. adhering to the shoots. By combining what were hitherto two separate processing steps into one, the device offers substantial savings in time and processing costs.

The machine is constructed along modular lines and can employ several conveyor modules and several pairs of rotating brushes, depending on the purpose at hand. The rotating brushes are arranged, as appropriate to the task, around the circumference of the long, narrow objects, so that the entire working surface can be processed at the same intensity, i.e. in the case of vine stocks, all buds can be removed. The conveyor modules can be arranged and adjusted so that they move the long, narrow objects forward for processing at a steady speed. Variations in the thickness of the objects can be compensated by the fact that the conveyor rollers are equipped with elastic rubber ribbing, which allows the gap between the rollers to vary. The surfaces of the conveyor rollers can also be equipped with foam padding material, so that the vine stocks can essentially be moved forward without slipping.

The effectiveness of the rotating brushes depends on the material used for the brushes, and on the distancing of the brushes from the axis of motion. This distance can be adjusted for process different kinds of objects, including stock shoots of differing strength. In addition, the individual brushes can be arranged on their drive shaft so that they are readily exchangeable. For further processing steps, individual brushes can be replaced by grinding or polishing disks.

According to a further development of the invention, an automatic feed device for long, narrow objects is inserted in front of the processing machine equipped with a device for counting the objects processed. In the case of vine shoots, devices can also be installed behind the processing machine for cutting the processed shoots into lengths and packaging them.

Figure 2:
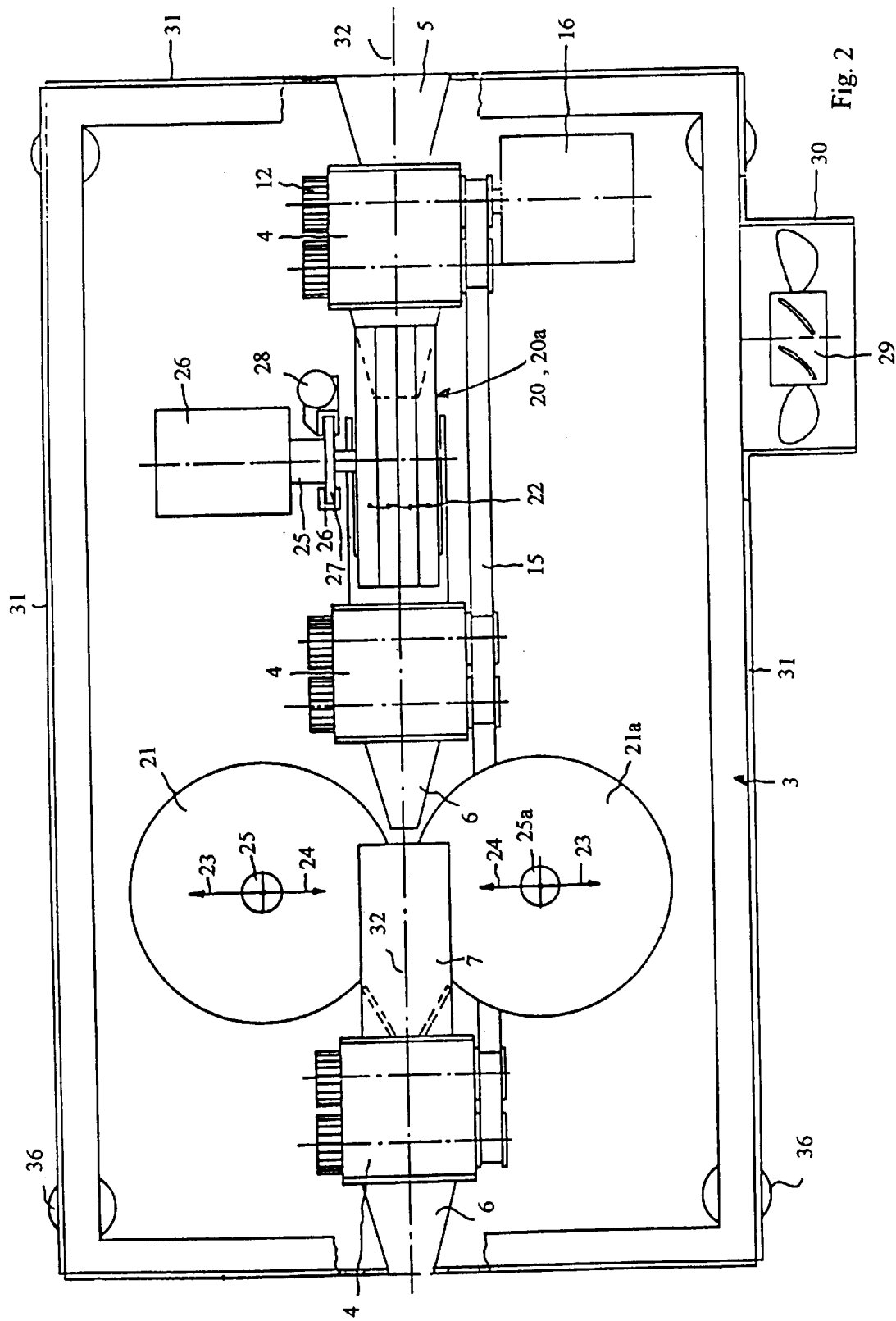
Figure 4:
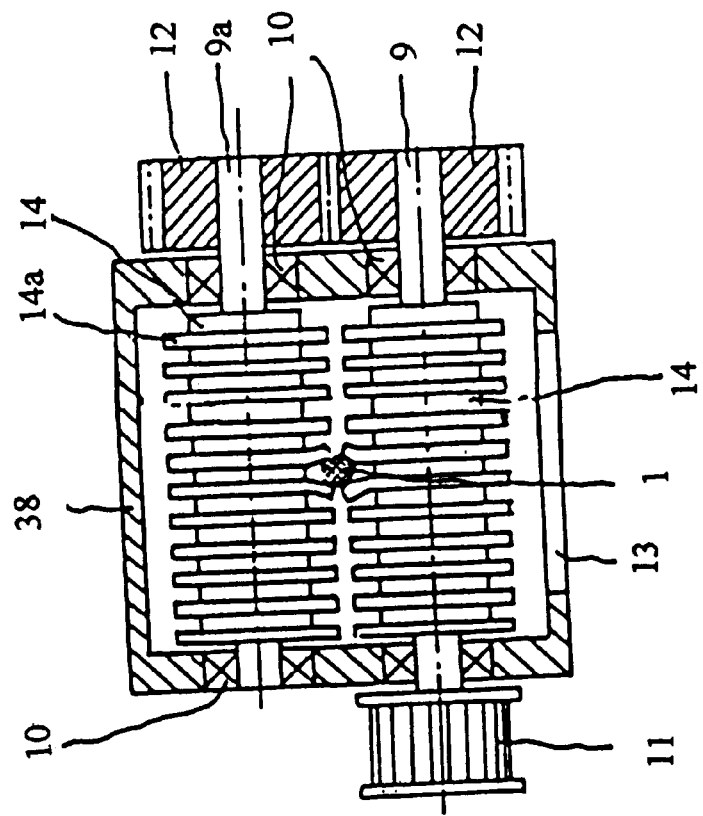
Figure 3:
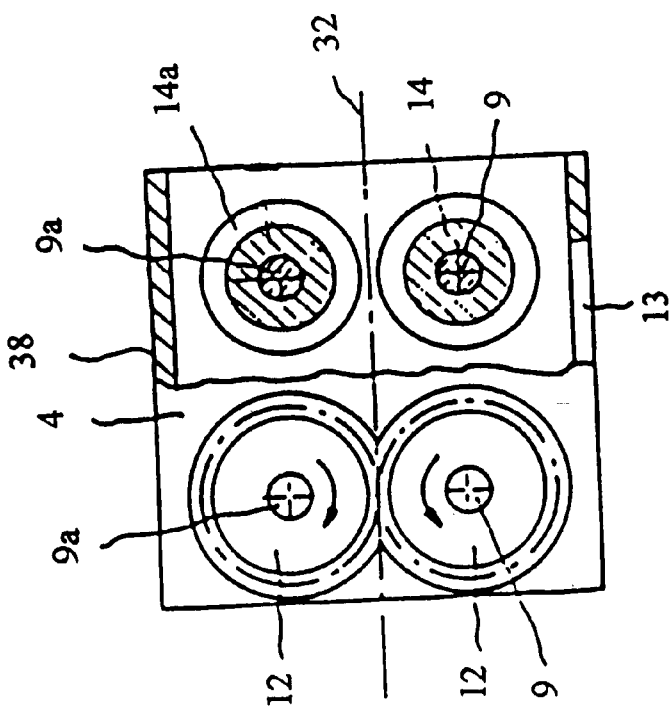

A sample embodiment of the invention is described, on the basis of the accompanying illustrations. These show:

FIG. 1 a partial cross-sectional side view of the vine stock processing machine;

FIG. 2 an overhead view of the vine stock processing machine;

FIG. 3 a partial cross-sectional side view of a conveyor module;

FIG. 4 a cross-section through a conveyor module, at right angles to the direction of motion.

The major structural components of the stock processing machine are a frame 3, three conveyor modules 4 and four rotating brushes 20, 20a, 21, 21a, arranged in two pairs. An imaginary axis runs through the middle of the machine, passing through the brush pairs 20/20a and 21/21a and through the conveyor modules 4, along which the vine shoots 1 are to run. The vine shoots to be precessed 1 have nodes 2, spaced at known intervals (the so-called internodes) that vary by vine variety, and at which are located the buds (eyes) that must be brushed off.

The pairs of rotating brushes 20/20a and 21/21a are arranged on planes at a 90° angle to each other, each between two conveyor modules 4. The reciprocal arrangement of the brushes and the conveyor modules ensures the consistent processing of the shoot over its entire length, and in particular in the areas near its ends.

The number of rotating brush pairs and conveyor modules is variable. In a simplified embodiment of the invention, a single conveyor module 4 is combined with a single pair of rotating brushes 20/20a. To enhance the quality of processing, several rotating brush pairs can be used. The angling of the brush pairs to each other and around the axis of motion 32 is reduced when higher numbers of brush pairs are used, so that the circumference of the shoots can be even more consistently processed.

The individual rotating brushes 20+20a and 21+21a are driven on shafts or hubs 25, 25a by a motor 26, either in or against the direction of motion of the shoot. The interval between the individual brushes 21+21a and 20+20a, and the processing gap, can be varied so that the width of the passage and the intensity of the processing can be ideally adjusted to the material that is being processed.

As shown in FIGS. 1 and 2, the brush hubs 25, 25a are affixed to separate disks 27, which can be shifted towards or away from each other and fixed in position on a linear guide 30. This procedure is accomplished by means of a spindle (not shown) with left and right threading, located in the frame 3. The accompanying spindle nuts with left and right treading rest on one of the two disks 27. When the spindle is turned by action of the handwheel 28, the brush hubs move simultaneously in a direction 23 away from the axis 32 or in a direction 24 towards it, so that the shoot 1 encounters a wider or narrower processing gap as it passes through. In this way, the abrasive effect of the rotating brushes can be reduced or increased. The processing effect of the rotating brushes can be further influenced by the fact that the revolution speed of the motor 26 can be varied.

In one embodiment of the invention, the rotating brushes 20, 20a, 21, 21a contain several thin elements 22 that are mounted together into a thicker brush. The way these elements are assembled has the advantage that the inner elements 22, which work near the axis 32 and tend to wear out faster, can be replaced by the outer elements that wear less quickly., and this extends the useful life of the entire brush assembly. Different materials in varying dimensions can be used to make the rotating brushes.

As can most readily be seen in FIGS. 3 and 4, the conveyor modules 4 have a housing 38 where two shafts or axles 9, 9a are arranged, supported on ball bearings 10, at right angles to the axis of motion 32. The conveyor modules 4 are mounted on holders 8 (FIG. 1), that are in turn attached to the frame 3.

The shafts or axles 9 and 9a together form a conveyor axle pair. They are coupled to each other by two mutually engaging cogwheels 12, so that a turning motion produced by the belt-driven cogwheel 11 is transferred without slippage from axle 9 to the partner axle 9a, which is then set in a contrary turning motion. A conveyor roller 14 with elastic ribs 14a is coupled to each of the axles 9, 9a. The ribs 14a are arranged radially on the conveyor roller, but they may also be arranged along its axis. The drive wheels 11 resting on the axle 9 are driven by a motor 16 (FIG. 2) and a toothed drive belt 15. The drive belt 15 encircles the drive wheels 11, several clutch transmission 17, a tension roller 18 and the motor drive wheel 37, in the manner shown in FIG. 1, so that all of the conveyor axles 9 turn in the same direction and at the same rate. The tension roller 18 is slidably received in a slot 19 for being urged downwardly.

This particular embodiment of the invention means that the two axles 9, 9a of a conveyor roller pair are made to turn in opposite directions to each other, so that the shoot 1 is pushed forward along the axis 32 as it passes between the two conveyor rollers 14. The elastic ribs 14a and the rollers 14 ensure a firm grip and a largely slippage-free forward motion of the shoot 1, while avoiding any risk of injury or crushing to the shoot 1. This embodiment also has the advantage that shoots of differing calibre, irregularities of growth and varying inter-nodal lengths can be conveyed without having to make any adjustments to the mechanism.

In one embodiment of the invention, the motor 16 has a continuously variable revolution control for driving the drive belt 15, so that the shoot 1 can be made to pass through the machine at any desired speed.

In the preferred embodiment of the invention, there are two conveyor roller pairs 14 with their axles 9, 9a arranged in each conveyor module. For cases where the gripping power of the conveyor rollers 14 needs to be either heightened or diminished, the number of roller pairs in a conveyor module can be increased or reduced accordingly.

So that the shoot 1 can be guided accurately through the machine along the predetermined axis 32, each conveyor module 4 has an in-feed funnel 5 or a connecting funnel 7 and an outflow funnel 6. The in-feed or outflow apertures are thereby dimensioned so that shoots of differing calibre are not allowed to deviate sideways from the directional axis 32, and so that they can be properly grasped by the rotating brushes.

The conveyor modules 4 have an opening 13 on their under side, through which dirt, buds or fibres can fall as they are released. The conveyor modules 4 are thus self-cleaning and protected from plugging up. The frame 3 of the machine is open on the under side, so that the material removed by the brushes drops directly through an aperture 34 in the table 33, where it can be disposed of.

In order to eliminate the risk of damage and to protect against the build-up of dust, the frame 3 is equipped with covers 31 on all exposed sides. To allow optical surveillance of the operation of the machine according to the invention, these covers should preferably be made of a transparent material.

In one embodiment of the invention, a lighting device is installed either outside or within the frame 3, to facilitate optical surveillance.

In order to remove the dust arising from the abrasion process, and to enhance visual control, the covering 33 has an exhaust fan 29 installed in it, together with a hose connection. This allows a an exhaust pipe to be attached (not shown), so that the abrasion dust can be conducted continuously away from the work site.

The machine is mounted on rubber support elements 36, in order to absorb vibrations. Since successive stages of the vine grafting procedure require shorter lengths of shoot than those used initially, one embodiment of the invention is equipped at its downstream end with an automatic device (not shown) for cutting the shoot into predetermined lengths. Thus, for example, the shoot 1 runs up against a stop, and a sheering or dropping blade is activated to cut off the back end of the shoot. The shoot then falls into a container, where it can be counted In a further embodiment of the invention, the frame 3 is equipped with an automatic charge mechanism (not shown) at the in-feed funnel. This charging device takes each shoot 1 individually out of the storage bin and shoves it into the funnel 5 of the processing machine. The storage bin can have a funnel-shaped narrowing, in which an extraction shaft is arranged with receptacles for the shoots, so that by turning the extraction shaft at the proper speed, single shoots can be taken out of the bin at the desired rate.

At the shoot outflow point/funnel 6, an automatic device (not shown) for packaging the processed shoots 1 is arranged on the frame 3, either separately or in conjunction with the size-cutting device 35. In this way, the machine can operate completely automatically, without service personnel.

In a further form of the invention, a counting device (not shown) can be installed at an appropriate place to count the shoots 1 as they are processed.

What is claimed is:

1. A machine for surface processing of long, narrow objects having a cross-sectional dimension and buds thereon, for removing such buds, comprising:

a frame fixture defining an object feeding axis;

at least one conveyor module, said conveyor module being mounted at said frame fixture and containing at least one pair of conveyor rollers that are rotatably drivable and have a transport gap therebetween, said transport gap having a dimension corresponding to said cross-sectional dimension of said objects to be transported, said transport gap being arranged along said feeding axis, said conveyor rollers having surface structures adapted to advance said objects along said feeding axis without slipping and without damaging said objects; and tools for removing buds from said objects that are mounted at said frame fixture along said feeding axis, said tools containing at least one pair of rotatably drivable brushes co-operating to define a processing gap that is arranged along said feeding axis, said brushes being adapted and arranged to rub off said buds from said objects; wherein said objects comprise plant or vine shoots having at least one of a ligneous substance and a bark.

2. A machine according to claim 1, wherein two or more of said conveyor modules forming a row are mounted along said feeding axis so as to transport said objects introduced in a first conveyor module of said row through said row of conveyor modules.

3. A machine according to claim 2, wherein each brush pair in a feeding direction of said conveyor modules is preceded and followed by a respective conveyor module, and wherein each conveyor module comprises a trailing funnel and a leading funnel, seen in said feeding direction.

4. A machine according to claim 2, wherein said conveyor modules comprise a common drive arrangement including endless drive elements.

5. A machine according to claim 1, wherein two pairs of said rotational brushes are mounted along said feeding axis so as to act on said objects transported along said feeding axis.

6. A machine according to claim 5, wherein each said rotational brush pair defines a main plane of rotation, the main plane of one brush pair being angularly offset to the main plane of the other pair.

7. The machine according to claim 5, wherein each said pair of brushes comprises individual drives.

8. The machine according to claim 7, wherein said individual brush drive is adjustable in its rate of revolution and its direction of revolution.

9. A machine according to claim 5, wherein said pairs of brushes have a common drive arrangement.

10. A machine according to claim 1, wherein said frame fixture comprises a casing wall having an opening for elimination of refuse.

11. The machine according to claim 10, wherein said opening includes an exhaust device.

12. A machine according to claim 1, wherein said at least one pair of brushes is exchangeable for another pair of brushes different in size.

13. A machine according to claim 1, wherein each brush of said at least one pair of brushes has a rotational axis, said rotational axes of a brush pair defining a distance, said distance between said axes of said brush pair being adjustable.

14. A machine according to claim 1, wherein each brush of said brush pairs comprises brush elements that are exchangeable.

15. A machine according to claim 1, wherein each said conveyor roller of a conveyor module comprises a shaft and a gear connected thereto, the gears of a conveyor module meshing with one another.

16. A machine according to claim 1, wherein each said conveyor rollers of each conveyor module are equipped with elastic ribs as said surface structures for advancing said objects.

17. A machine according to claim 1, wherein said conveyor rollers of each conveyor module are equipped with foam padding as said surface structures for advancing said objects.

18. A machine according to claim 1, also comprising a rotational drive for said conveyor rollers, said drive being adjustable to operate at different speeds.

19. A machine according to claim 1, wherein each said conveyor module comprises a housing having an outlet opening for refuse at its lower side.

20. A machine according to claim 1, also comprising a lighting installation.

21. A machine according to claim 1, also comprising a sizing device for cutting said objects into pieces of predetermined length.

22. A machine according to claim 1, also comprising a counting device for counting the number of said objects processed.

23. A machine according to claim 1, also comprising an automatic charging device for unprocessed objects which is adapted to pick up such objects individually from a storage bin and to feed them into said at least one conveyor module.

24. A machine according to claim 1, also comprising an automatic packaging device for processed objects that is adapted to wrapping said objects in a covering.

25. A process for removing buds from vine or plant shoots having a ligneous substance and a bark, comprising the steps of:

entering said shoots, one after the other, into a transport gap of a pair of conveyor rollers;

advancing said shoots along a shoot feeding axis by rotating said conveyor rollers and gripping said shoots by surface structures of said conveyor rollers that advance said shoots along said shoot feeding axis without slipping and without damaging said shoots; and rubbing off said buds from said shoots by rotating brushes that are arranged along said shoot feeding axis and at an adjustable distance thereto, said rubbing off being carried out without damaging said bark or said ligneous substance of said shoots.

* * * * *